(No Model.)
T. F. WILLIAMS.
REVOLVING DIP NET.
No. 245,251. Patented Aug. 2, 1881.
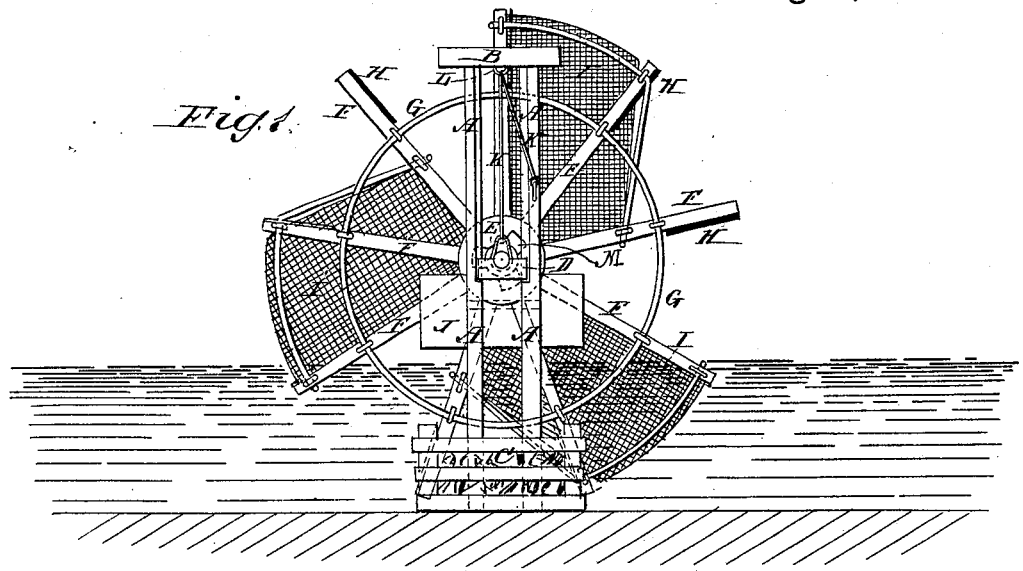
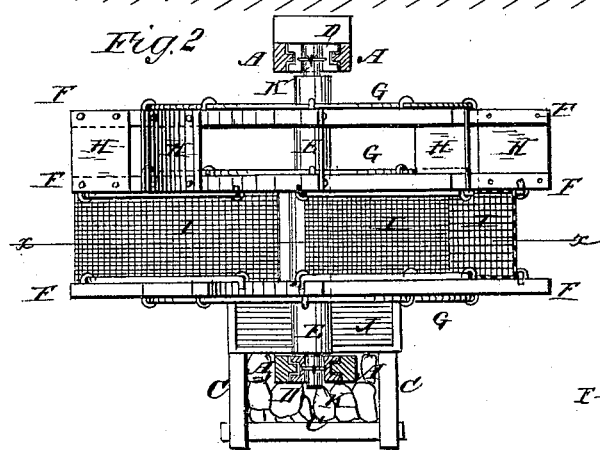
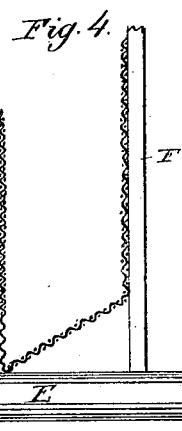
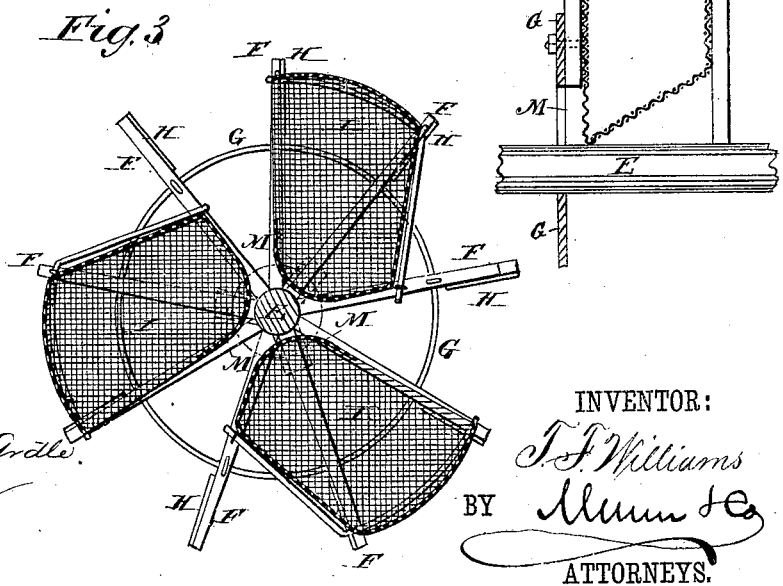
WITNESSES:
Francis McArdle
C. Sedgwick
INVENTOR:
T. F. Williams
BY Munn & Co
ATTORNEYS.

UNITED STATES PATENT OFFICE.

THORNTON F. WILLIAMS, OF LOWER CASCADES, OREGON.

REVOLVING DIP-NET.

SPECIFICATION forming part of Letters Patent No. 245,251, dated August 2, 1881.

Application filed November 4, 1880. (No model.)

*To all whom it may concern:*

Be it known that I, THORNTON FREEMAN WILLIAMS, of Lower Cascades, in the county of Wasco, in the State of Oregon, have invented a new and useful Improvement in Revolving Dip-Nets, of which the following is a specification.

Figure 1 is side elevation of the improvement. Fig. 2 is a sectional plan view. Fig. 3 is a sectional side elevation, taken through the line $x\, x$, Fig. 2. Fig. 4 is a detail view of the discharge-opening and inclined bottom.

Similar letters of reference indicate corresponding parts.

The object of this invention is to furnish revolving dip-nets for catching fish as they are ascending streams which shall be simple in construction, automatic in operation, and readily adjusted to the height of the water.

In the accompanying drawings, A are two pairs of posts set in the bed of the stream. The posts of each pair are connected at their upper ends by a bar, B. The pair of posts next the bank are surrounded by a crib, C, filled with stones to strengthen it against the current.

D are bearing-boxes for the journals of the shaft E, which shaft may be made of any desired length, and to which are attached three circles of radial spokes or arms, F, fifteen feet, more or less, in length. The arms or spokes F of each circle are strengthened in position by one or more rings, G, attached to them.

To the outer parts of the spokes F of the first and second circles are attached paddles H, for the water to strike against, so that the wheel will be revolved by the force of the current.

To the spokes F of the second and third circles are attached the nets I, which are made of wire or twine. The forward side of each net I is open, except at the inner part, and its edges extend along and are secured to a pair of spokes. The outer ends of the nets I are attached to the outer ends of four spokes, F, and their inner ends are attached to six spokes, F. In the forward outer corner of the inner end of each net I is formed a hole of such a size as to discharge the fish into a receiving-box, J, attached to the posts A. The inner end of the net I is so formed as to incline toward the discharge-hole when the net is above the shaft E. The outer ends of the nets I should project beyond the paddles H to cause the said outer ends of the nets I to move faster than the current, so that the said outer ends will rise above the water before the fish that enter the nets can strike the rear sides of the nets, turn, and escape.

To the bearing-boxes D are attached the ends of cords K, which pass over pulleys or guides L, pivoted to the centers of the top bars, B. The other ends of the cords K are secured to belaying-cleats or other fastenings attached to the posts A. By this construction the wheel can be raised and lowered as the height of the water may require.

In setting the wheel the channel below the wheel should be deepened, so as to be deeper than the other parts of the stream, so that a large volume of water will pass below the wheel.

Having thus described my invention, I claim as new and desire to secure by Letters Patent—

1. In a revolving dip-net, the box-nets I, constructed with holes M at their inner ends, substantially as herein shown and described, whereby the first are discharged, as set forth.

2. The nets I, secured to arms of shaft E, having an opening at the front, except at the inner part, for the inlet of the fish, and at the rear an opening for their outlet, as shown and described.

3. The combination, with a rotary wheel having nets I, with discharge-openings M near the hub, and having the inner part inclined toward said openings, of a receptacle, J, arranged as shown and described.

THORNTON FREEMAN WILLIAMS.

Witnesses:
J. E. ANDREWS, Jr.,
JOHN E. ANDREWS, Sen.